(12) United States Patent
Lim et al.

(10) Patent No.: US 7,987,180 B2
(45) Date of Patent: *Jul. 26, 2011

(54) CLASSIFICATION-BASED METHOD AND APPARATUS FOR STRING SELECTIVITY ESTIMATION

(75) Inventors: Lipyeow Lim, North White Plains, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 12/057,885

(22) Filed: Mar. 28, 2008

(65) Prior Publication Data
US 2008/0208856 A1    Aug. 28, 2008

Related U.S. Application Data

(63) Continuation of application No. 11/474,475, filed on Jun. 26, 2006, now Pat. No. 7,395,270.

(51) Int. Cl.
*G06F 7/00* (2006.01)
(52) U.S. Cl. ...................................................... 707/716
(58) Field of Classification Search ........... 707/999.006, 707/716
See application file for complete search history.

(56) References Cited

U.S. PATENT DOCUMENTS

| | | | |
|---|---|---|---|
| 6,401,088 B1 | 6/2002 | Jagadish et al. | |
| 6,662,184 B1 | 12/2003 | Friedberg et al. | |
| 6,865,567 B1 | 3/2005 | Oommen et al. | |
| 6,876,999 B2 | 4/2005 | Hill et al. | |
| 2006/0179052 A1 | 8/2006 | Pauws et al. | |

OTHER PUBLICATIONS

Chaudhuri et al., Selectivity Estimation for String Predicates: Overcoming the Underestimation Problem, Proceedings of the 20th International Conference on Data Engineering (published 2004).*
Lim et al., XPathLearner: An On-Line Self-Tuning Markov Histogram for XML Path Selectivity Estimation, Proceedings of the 28th VLDB Conference (published 2002).*
A Query Language for XML; A. Deutsch, et al.; http/www.8.org/w8-papers/lc-xml/query/query.html; pp. 1-18.
XPathLearner; An On-Line Self-Tuning Markov Histogram for XML Path Selectivity Estimation; L. Lim, et al.; Proceedings of the 28th VLDB Conference; Hong Kong, China, 2002 pp. 1-12.
Estimating Answer Sizes for XML Queries; Y. Wu, et al.; pp. 1-18 (Abstract).
Counting Twig Matches in a Tree; Z. Chen, et al.; http:/Informatik.unl-trier.dc/ley/db/Index.html. pp. 1-10.
STATIX; Making XML Count; J. Freire, et al.; ACM SIGMOD Jun. 4-6, 2002; Madison, Wisconsin; Copyright 2002; pp. 1-11.

(Continued)

*Primary Examiner* — Greta L Robinson
*Assistant Examiner* — Jensen Hu
(74) *Attorney, Agent, or Firm* — Whitham, Curtis, Christofferson & Cook, P.C.; Stephen C. Kaufman

(57) ABSTRACT

Histogram construction and selectivity estimation for string and substring match queries in databases of data having strings associated with attributes. The histogram construction counts string-attribute pairs in the documents, and outputs string-attribute-count triples sorted by count. The collection is partitioned into buckets. A synopsis is generated for the partition, having an average selectivity or count of the string-attribute-count triples in the partition and summary information representing the set of string-attribute pairs belonging to the bucket. Subsequent queries, both for exact and substring matches, use the synopsis to estimate the selectivity of buckets.

19 Claims, 4 Drawing Sheets

OTHER PUBLICATIONS

Bloom Histogram; Path Selectivity Estimation for XML Data With Updates; W. Wang, et al.; Proceedings of the 30th VLDB Conference, Toronto, Canada, 2004; (abstract) pp. 240-251.

Structure and Value Synopses for XML Data Graphs; N. Polyzotis, et al.; Proceedings of the 28th VLDB Conference, Hong Kong, 2002; pp. 1-12.

Statistical Synopses for Graph-Structured XML Database; N. Polyzotis, et al.; ACM SIGMOD, Jun. 4-6, 2002, Madison Wisconsin; pp. 1-12.

Estimating the Selectivity of XML Path Expressions for Internet Scale Applications; A. Aboulnaga, et al.; Proceedings of the 27 VLDB Conference, Roma, Italy, 2001; pp. 1-10.

* cited by examiner

CLASSIFICATION-BASED METHOD AND APPARATUS FOR STRING SELECTIVITY ESTIMATION

This application is a continuation of U.S. patent application Ser. No. 11/474,475, filed Jun. 26, 2006, now issued as U.S. Pat. No. 7,395,270, and which is incorporated herein by reference.

FIELD OF THE INVENTION

The field of the invention is data processing, more specifically, a system and method for collecting and maintaining statistics and generating selectivity estimation for string and substring match queries in databases of any data having strings associated with attributes.

BACKGROUND OF THE INVENTION

XML is an example of a database of strings associated with attributes, and in native database management systems ("DBMSs") of, for example, XML documents, the documents are stored as trees and queries are processed using either indexes or tree traversals. Nodes in a XML tree are often located using paths.

A path is a sequence of tag names that specify a navigational trajectory to a set of nodes in the XML tree. A rooted path is one that begins at the root node of the XML tree. For efficient processing, complex path expressions in XML queries are often preprocessed into a set of candidate (path, pred) pairs, where "path" is a linear rooted path and "pred" is a string predicate on the leaf value reachable via path. Consequently, an XML query (such as XQuery) can be mapped to several retrieval operations using (path, pred) pairs. These retrieval operations using (path, pred) pairs form the set of basic query processing operators. Accurate estimation of the selectivity of such (path, pred) pairs is therefore crucial for choosing an optimal execution plan in cost-based query optimization. Previous work on XML selectivity estimation has focused mainly on the tag-labeled paths (tree structure) of the XML data. Examples of this previous work are: A. Aboulnaga, et al., "Estimating the selectivity of XML path expressions for internet scale applications," VLDB 2001, pp. 591-600, (2001), N. Polyzotis, et al., "Statistical synopses for graph-structured XML databases," SIGMOD 2002, pp. 358-369, (2002).

However, for most actually existing attribute-string databases, such as XML, the number of distinct string values at the leaf nodes is orders of magnitude larger than the set of distinct rooted tag paths. A significant challenge therefore exists in accurately estimating the selectivity of string predicates on the leaf values reachable via a given path.

Using XML as an example, the XML string selectivity estimation problem is defined as follows: Given a (path, pred) query, where pred is a string predicate, estimate the number of nodes in the XML data that are reachable by path and whose associated string values satisfy the string predicate pred. Examples of queries with different string predicates include exact match queries and substring queries. An exact match query is specified by a (path, string) pair and retrieves all nodes reachable via path whose string value matches the query string exactly. A substring query is specified by a (path, substring) pair and retrieves all nodes reachable via path whose string value contains substring.

The present invention provides a novel method for collecting and maintaining statistics to support selectivity estimation for both exact/full string match queries and substring match queries of any database of documents arranged data strings associated with any number of attributes. In the case of XML, the data consists of path-string pairs, where each string is associated with exactly one attribute that is a path. In other cases, each string can be associated with any number (including zero) of attributes.

SUMMARY OF THE INVENTION

Given a set of documents in a language comprising strings associated with attributes, such as XML, a partition-based histogram is generated that is much smaller in size than the original data set. The generated histogram can support, for example, selectivity estimation for both exact/full string match queries and substring match queries in such string databases accurately.

DETAILED DESCRIPTION OF PREFERRED EMBODIMENTS

Figure 1:
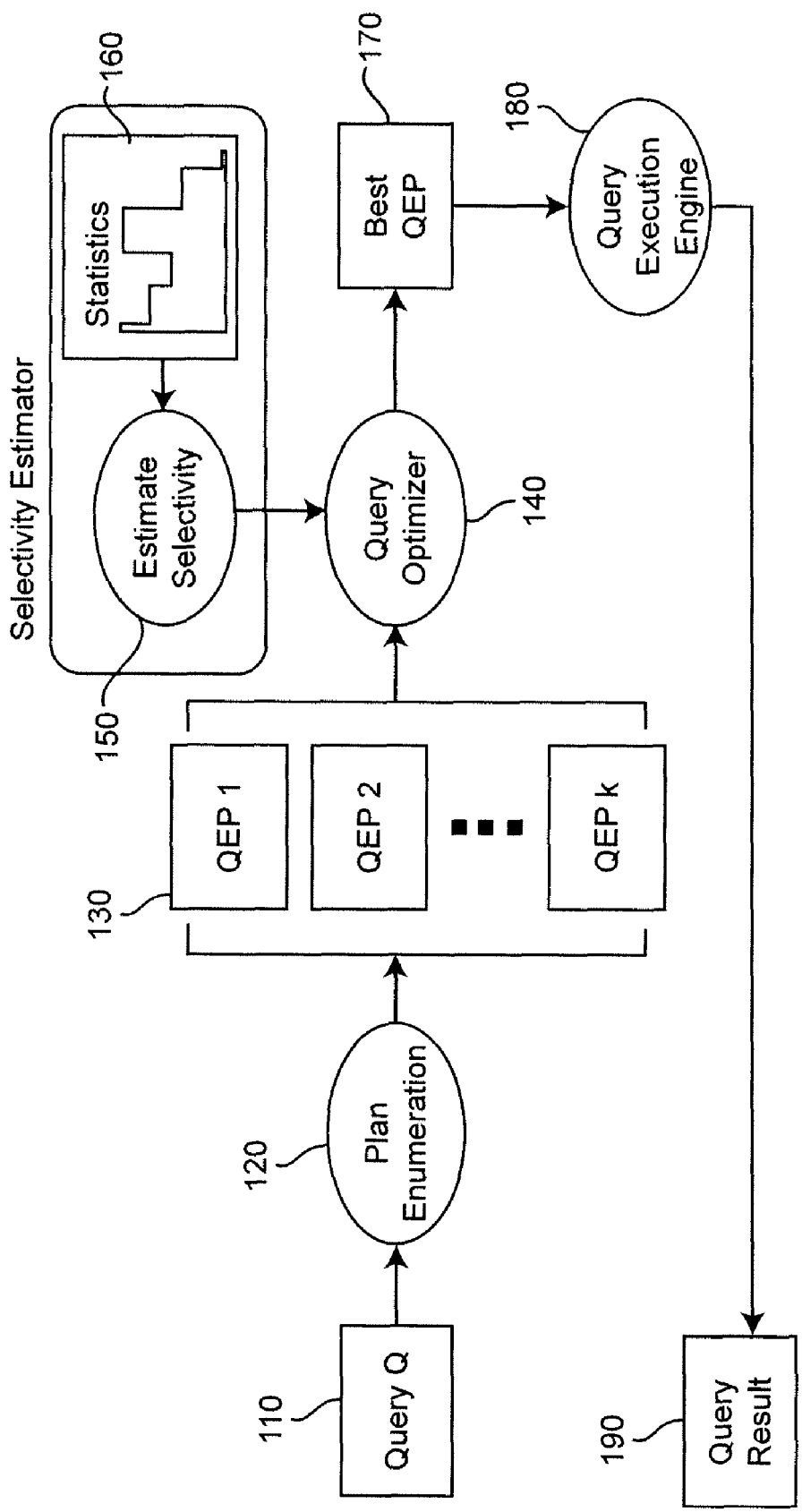
FIG. 1 illustrates an importance of the selectivity estimation in a cost-based query optimizer of a database management system.

FIG. 1 illustrates the importance of the selectivity estimation, of which the present invention is a solution, in a cost-based query optimizer of a database management system. Block 110 denotes a user query expressed in some declarative query language such, as for example, Structured Query Language (SQL). Block 120 denotes a plan enumeration process that takes as input the query 110 and outputs a collection of query execution plans 130, each of which will generate the correct result. The query optimizer 140 uses the selectivity estimator 150 to evaluate each of the query execution plans 130 in order to output the most efficient plan 170. The selectivity estimator 150 requires statistics 160 in order to return selectivity estimates to the query optimizer 140. The chosen query execution plan 170 is then executed by the query execution engine 180, and the query result 190 is returned to the user.

Figure 2:
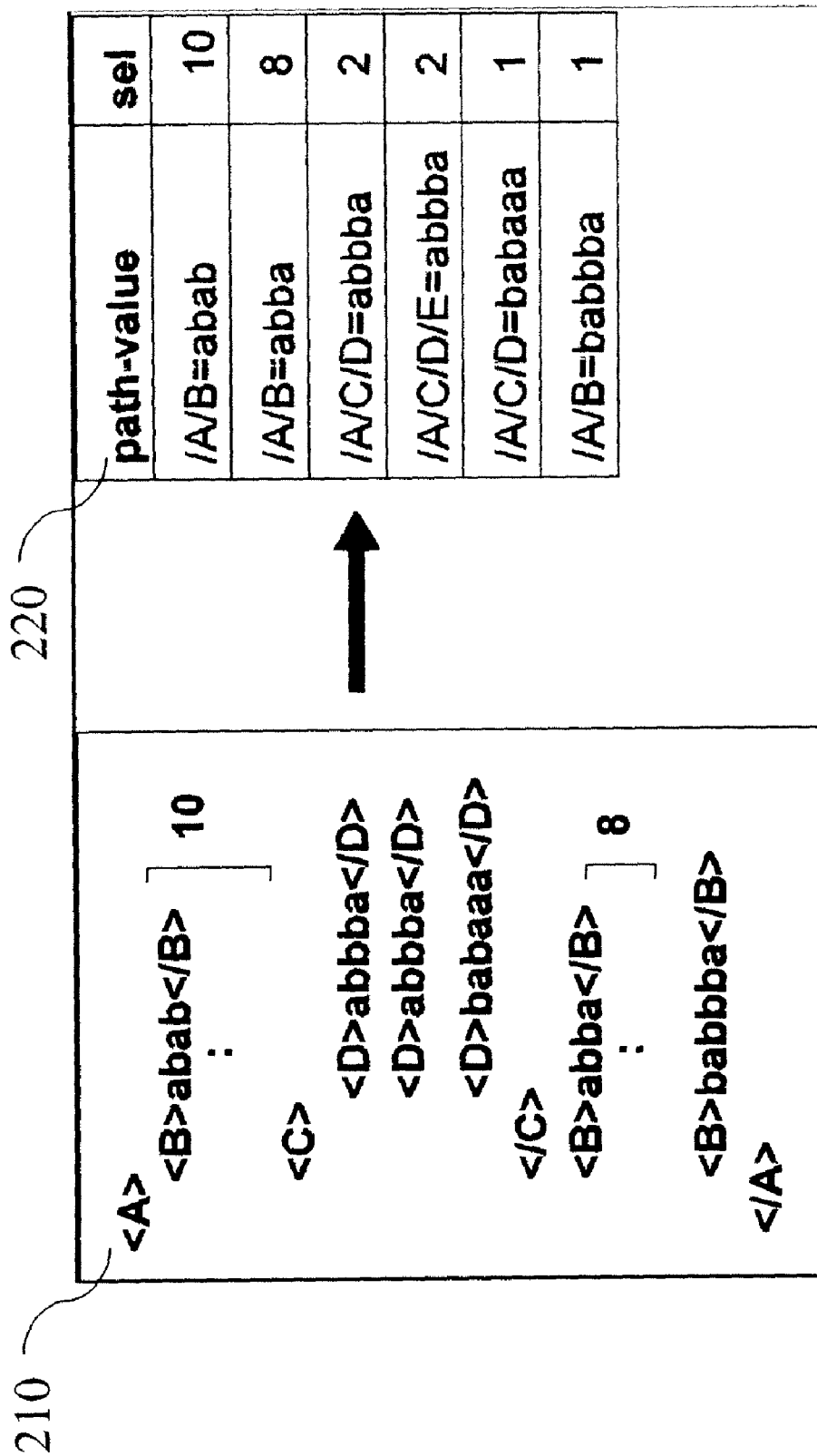
FIG. 2 illustrates the definition of string selectivity using an exemplary XML document.

FIG. 2 illustrates the definition of string selectivity in a database of string-attribute documents, such as XLM, using an exemplary XML document denoted by 210. It will be understood that XML is used only as example string-attribute language for purposes of describing the present invention, as XML is well known and, therefore, the theory, operation and implementation of the invention can be easily understood from this description and present invention readily applied, by persons skill in the relevant art, to any data where strings in the data are associated with any number of attributes. In the case of XML, the data consists of path-string pairs, where each string is associated with exactly one attribute that is a path. In other cases, each string can be associated with any number (including zero) of attributes.

Referring again to FIG. 2, block 220 shows the selectivity of all of the exact string match path-value pairs entailed by the exemplary XML document of 210. For example, the exact match query (/A/B, abab) on the exemplary XML document in FIG. 2 has a selectivity of 10, and the substring query (/A/B, *bba*) has a selectivity of 9.

The current invention can be used to estimate the selectivity for both exact/full string match queries and substring match queries in, for example, XML databases. It can be described as being composed of two parts: histogram construction and selectivity estimation.

Figure 3:
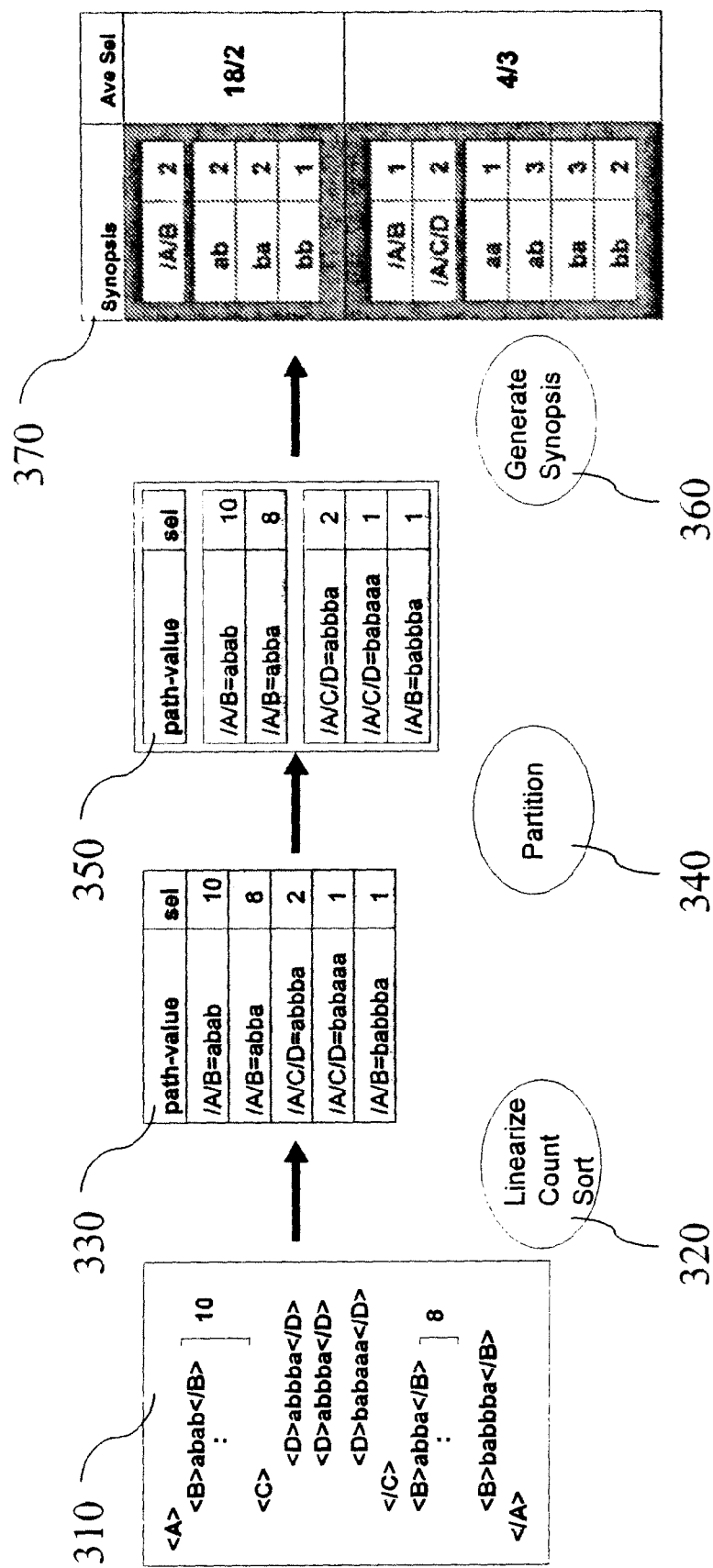
FIG. 3 illustrates how the partition-based histogram used by an exemplary embodiment of the present invention is constructed from the exemplary XML data.

Referring now to FIG. 3, the histogram construction procedure for an exemplary embodiment of the current invention is illustrated. The histogram construction procedure consists of three steps, labeled 320, 340, and 360, respectively. Step 320 counts each path-value pair in the example XML document 310 and outputs the collection of path-value-count triples sorted by count 330. Step 340 partitions the collection of sorted path-value-count triples 330 using a partitioning algorithm such as, for example, MaxDiff, LloydMax or equivalents.

The output of the partitioning algorithm is a collection of partitions, also referred to as "buckets", of path-value-count triples 350. In this example, two partitions or buckets are used. The generate synopsis step 360 extracts a synopsis for each partition. The exemplary synopsis for each partition consists of the average selectivity or count of all the path-value-count triples in the partition and some summary information that represents the set of path-value pairs belonging to this partition.

In the preferred embodiment of the current invention, the synopsis in each bucket, where the bucket identifier is BKT, consists of two types of counts:

1) Occurrence counts of paths that are associated with the bucket
2) Occurrence counts of the q-grams of the values that are associated with the bucket. For example, the 2-grams of the value "abbba" are "ab,bb,bb,ba".

The paths and the q-grams on the values are counted independently.

Figure 4:
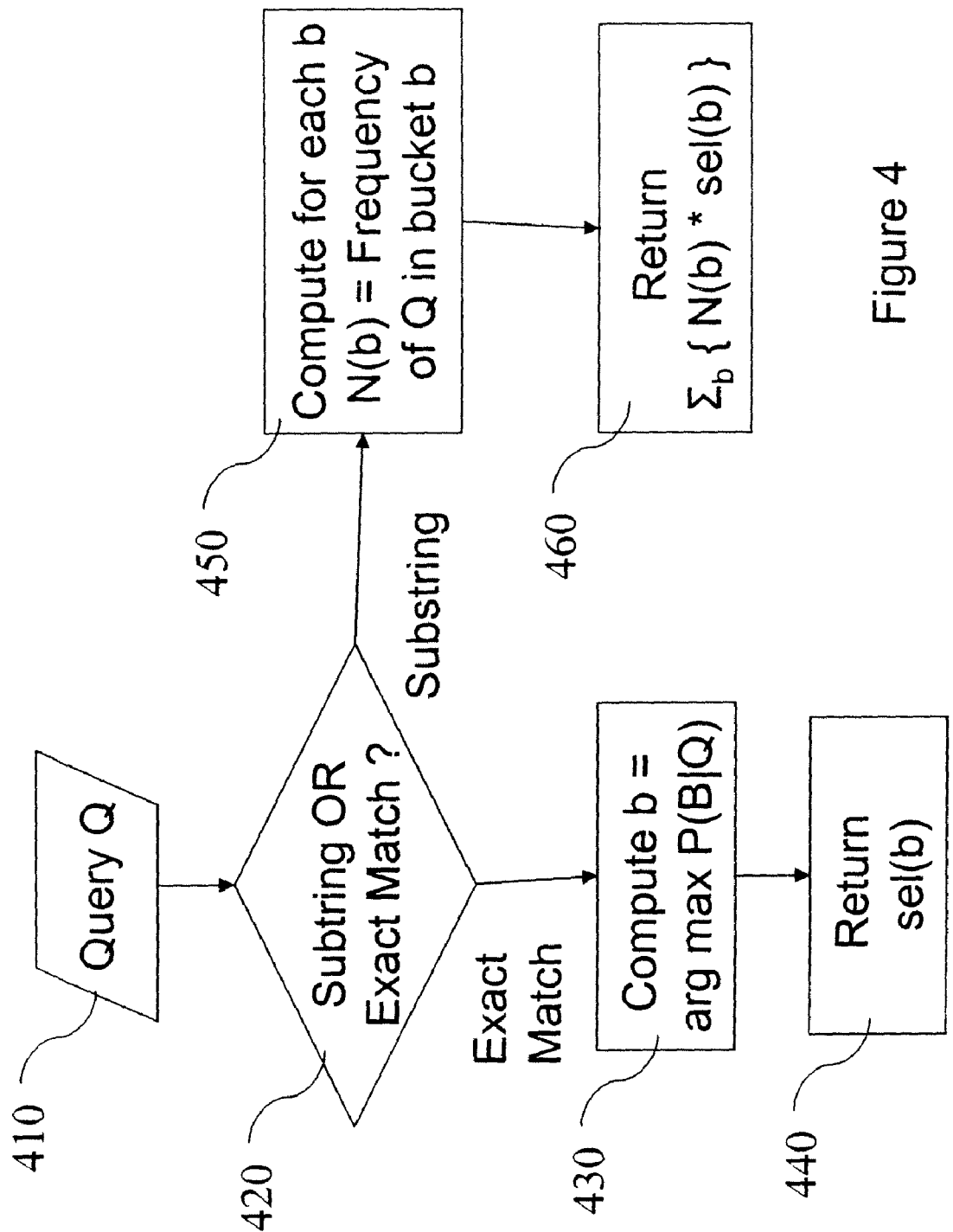
FIG. 4 illustrates the procedure for estimating the selectivity for both exact string match queries and substring match queries using the partition-based histogram according to the present invention.

Referring now to FIG. 4, the procedure for estimating the selectivity of exact and sub-string match queries according to the current invention is illustrated. Bock 410 denotes the input query Q that can either be an exact match query or a substring match query. The step 420 checks the type of the input query: if the input query is an exact match query, steps 430-440 are taken, and if the input query is a substring match query, steps 450-460 are taken. For exact match queries, step 430 computes the a posterior probability of each bucket given the query, using the synopsis in the histogram from FIG. 3, and finds the bucket bkt that maximizes the a posteriori probability.

Step 440 extracts the average selectivity sel(BKT) of bucket BKT from the histogram and returns it. For substring match queries, step 450 computes for each bucket b, the estimated number of times N(BKT) the substring query occurs in the bucket BKT. Step 460 uses these occurrence counts or frequencies to compute a weighted sum of the frequency N(BKT) and the average selectivity sel(BKT) of the bucket BKT. The weighted sum is returned as the selectivity estimate.

For example, using the exemplary histogram computed in FIG. 3 by the exemplary embodiment of the current invention on the exact match query /A/B=abab, the probabilities computed by step 430 are:

$$P(B=0 \mid /A/B = abab) = C * P(/A/B \mid B = 0) * P(ab \mid B = 0) * \\ P(ba \mid B = 0) \div P(b \mid B = 0) * \\ P(ab \mid B = 0) \div P(a \mid B = 0) * P(B = 0) \\ = C * 1 * \frac{2}{5} * \frac{2}{5} \div \frac{3}{5} * \frac{2}{5} \div 1 * \frac{2}{5} \\ = 0.0427 * C$$

$$P(B=1 \mid /A/B = abab) = C * P(/A/B \mid B = 1) * P(ab \mid B = 1) * \\ P(ba \mid B = 1) \div P(b \mid B = 1) * \\ P(ab \mid B = 1) \div P(a \mid B = 1) * P(B = 1) \\ = C * \frac{1}{3} * \frac{3}{9} * \frac{3}{9} * \div \frac{5}{9} * \frac{3}{9} \div \frac{4}{9} * \frac{3}{5} \\ = 0.03 * C, \text{ where } C \text{ is a constant,}$$
common to both probability terms.

C is derivable using, for example, Bayes's Rule, as follows:

$P(B=b|A=a)=C*P(A=a|B=b)*P(B=b)$.

From Bayes's Rule, $$P(B \mid A) = P(A, B) / P(A) \\ = P(A \mid B) * P(B) / P(A) \\ = P(A \mid B) * P(B) / [\text{Sum over all } BP(A, B)].$$

Therefore C=1/[Sum over all B P(A,B)] which is independent of the value of B.

Step 430 then determines that bucket 0 maximizes the probability. Step 440 returns the average selectivity of bucket 0, that is 9, as the estimate. For the substring match query /A/B=*bba*, step 450 computes the following frequencies, $$N(/A/B = *bba* \mid B = 0) = N(bb \mid B = 0) * N(ba \mid B = 0) \div \\ N(b \mid B = 0) \\ = 1 * 2 \div 3 \\ = \frac{2}{3}$$

$$N(/A/B = *bba* \mid B = 1) = N(bb \mid B = 1) * N(ba \mid B = 1) \div \\ N(b \mid B = 1) \\ = 2 * 3 \div 5 \\ = \frac{6}{5},$$

and 460 computes the estimate as the weighted sum, $$N(/A/B = *bba* \mid B = 0) * \text{Average selectivity of bucket } 0 + \\ N(/A/B*bba* \mid B = 1) * \text{Average selectivity of bucket } 1 = \\ \frac{2}{3} * 9 + \frac{6}{5} * 1.333 = 7.6$$

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We hereby claim:

1. A method for collecting and storing string match and substring match statistics for a database of documents composed in a language of strings associated with attributes, comprising:
   providing a memory limit value;
   providing a database including a plurality of data content values, wherein said data content values comprise strings and substrings;
   constructing a histogram consisting of multiple buckets of partitioned path-value pairs using a data model to construct a value synopsis for each of said buckets, wherein each bucket stores an average selectivity for the path-value pairs belonging to the bucket, wherein the constructing is such that the value synopsis encodes both a probability that a full string belongs to a given bucket, and an estimate of a frequency of sub-strings in each bucket, and summarization of data model parameters so that entire histogram fits within said memory limit value, and
   returning estimated selectivity i) for the full string as the average selectivity of an appropriate bucket and ii) for the sub-string as a weighted sum across all buckets of the average selectivity times the frequency of sub-strings in each bucket.

2. The method of claim 1, further comprising:
   receiving match query that is one of a full string match query type and a sub-string match query type;
   if the match query is a full string match query type, then finding the appropriate bucket using maximum a posterior probability; and
   if the match query is a sub-string match query type then
      (i) estimating the frequency of the sub-string in each bucket, and
      (ii) computing a weighted sum of bucket selectivity based on said frequency.

3. The method of claim 2, wherein the constructing a histogram includes:
   counting each value in a document;
   outputting a collection of value-count pairs sorted by said counting; and
   partitioning the collection of sorted value-count pairs into said buckets.

4. The method of claim 3, wherein the synopsis of each bucket includes data reflecting occurrence counts of q-grams of the values that are associated with the bucket.

5. A system for collecting and storing string match and substring match statistics for a database of documents composed in a language of strings associated with attributes comprising:
   a machine-readable storage medium;
   a machine-readable database of documents including a plurality of data contents values, wherein said values comprise strings and substrings;
   machine-readable program code, stored on the machine-readable storage medium, the machine-readable program code having instructions to provide a memory limit value, and instructions for constructing a histogram consisting of multiple buckets of partitioned path-value pairs using a data model to construct a value synopsis for each of said buckets, wherein each bucket stores an average selectivity for the path-value pairs belonging to the bucket, wherein the instructions are such that the value synopsis encodes both a probability that a full string belongs to a given bucket, and an estimate of a frequency of sub-strings in each bucket, and summarization of data model parameters so that entire histogram fits within said memory limit value, and
   machine readable program code for returning estimated selectivity i) for the full string as the average selectivity of an appropriate bucket and ii) for the sub-string as a weighted sum across all buckets of the average selectivity times the frequency of sub-strings in each bucket.

6. The system of claim 5, wherein the machine-readable program code further includes instructions for receiving match query and determining whether the query is a full string match query type or a sub-string match query type, and includes instructions such that
   (i) if the match query is determined as being a full string match query type, then finding the appropriate bucket using maximum a posterior probability, and
   (ii) if the match query is determined as being sub-string match query type then
      (a) estimating the frequency of the sub-string in each bucket, and
      (b) computing a weighted sum of bucket selectivity based on said frequency.

7. The system of claim 6, wherein the instructions for constructing a histogram include:
   instructions for counting each value in the document;
   instructions for outputting a collection of value-count pairs sorted by said counting; and
   instructions for partitioning the collection of sorted value-count pairs into said buckets.

8. The system of claim 7 wherein the instructions are such that the synopsis of each bucket includes data reflecting occurrence counts of q-grams of the values that are associated with the bucket.

9. A method for collecting and storing string match and substring match statistics for a database of documents composed in a language of strings associated with attributes, comprising:
   providing a memory limit value;
   providing a database including a plurality of data content values, with at least one attribute corresponding to each of said plurality, wherein said data content values comprise strings and substrings;
   constructing a histogram consisting of multiple buckets of partitioned path-value pairs using a data model to construct a value synopsis for each of said buckets, wherein each bucket stores an average selectivity for the path-value pairs belonging to the bucket, wherein the constructing is such that the value synopsis encodes both a probability that a full string belongs to a given bucket, and an estimate of a frequency of sub-strings in each bucket, and summarization of data model parameters so that entire histogram fits within said memory limit value, and
   returning estimated selectivity i) for the full string as the average selectivity of an appropriate bucket and ii) for the sub-string as a weighted sum across all buckets of the average selectivity times the frequency of sub-strings in each bucket.

10. The method of claim 9, further comprising:
    receiving match query that is one of a full string match query type and a sub-string match query type;
    if the match query is a full string match query type, then finding the appropriate bucket using maximum a posterior probability; and
    if the match query is a sub-string match query type then
       (i) estimating the frequency of the sub-string in each bucket, and (ii) computing a weighted sum of bucket selectivity based on said frequency.

11. The method of claim 10, wherein the constructing a histogram includes:
   counting each attribute-value pair in the document;
   outputting a collection of attribute-value-count triples sorted by said counting; and
   partitioning the collection of sorted path-value-count triples into said buckets.

12. The method of claim 11, wherein the synopsis of each bucket includes data reflecting an occurrence counts of attributes that are associated with the bucket, and data reflecting an occurrence counts of the q-grams of the values that are associated with the bucket.

13. A system for collecting and storing string match and substring match statistics for a database of documents composed in a language of strings associated with attributes comprising:
   a machine-readable storage medium;
   a machine-readable database of said documents including a plurality of data content values, with a corresponding attribute associated with each of said plurality, wherein said values comprise strings and substrings;
   machine-readable program code, stored on the machine-readable storage medium, the machine-readable program code having instructions to provide a memory limit value, and instructions for constructing a histogram consisting of multiple buckets of partitioned path-value pairs using a data model to construct a value synopsis for each of said buckets, wherein each bucket stores an average selectivity for the path-value pairs belonging to the bucket, wherein the instructions are such that the constructing is such that the value synopsis encodes both a probability that a full string belongs to a given bucket, and an estimate of a frequency of sub-strings in each bucket, and summarization of data model parameters so that entire histogram fits within said memory limit value, and
   machine readable program code for returning estimated selectivity i) for the full string as the average selectivity of an appropriate bucket and ii) for the sub-string as a weighted sum across all buckets of the average selectivity times the frequency of sub-strings in each bucket.

14. The system of claim 13, wherein the machine-readable program code further includes instructions for receiving match query and determining whether the query is a full string match query type or a sub-string match query type, and includes instructions such that
   (i) if the match query is determined as being a full string match query type, then finding the appropriate bucket using maximum a posterior probability, and
   (ii) if the match query is determined as being sub-string match query type then
      (a) estimating the frequency of the sub-string in each bucket, and
      (b) computing a weighted sum of bucket selectivity based on said frequency.

15. The system of claim 14, wherein the instructions for constructing a histogram include:
   instructions for counting each attribute-value pair in the document;
   instructions for outputting a collection of attribute-value-count triples sorted by said counting; and
   instructions for partitioning the collection of sorted attribute-value-count triples into said buckets.

16. The system of claim 15, wherein the instructions are such that the synopsis of each bucket includes data reflecting occurrence counts of attributes that are associated with the bucket, and data reflecting occurrence counts of q-grams of the values that are associated with the bucket.

17. The method of claim 10, wherein the database includes XML documents and the constructing is such that the attribute-value synopsis is a path-value synopsis that encodes the probability that a full string belongs to a given bucket, a frequency of sub-strings in each bucket, and summarization of data model parameters so that entire histogram fits within said memory limit value.

18. The method of claim 17, wherein the constructing a histogram includes:
   counting each path-value pair in the document;
   outputting a collection of path-value-count triples sorted by said counting; and
   partitioning the collection of sorted path-value-count triples into said buckets,
   wherein the synopsis of each bucket includes data reflecting occurrence counts of paths that are associated with the bucket, and data reflecting occurrence counts of q-grams of the values that are associated with the bucket.

19. The system of claim 14, wherein the database includes XML documents and the instructions are such that the constructing is such that the attribute-value synopsis is a path-value synopsis wherein the synopsis of each bucket includes data reflecting an occurrence counts of paths that are associated with the bucket, and data reflecting an occurrence counts of the q-grams of the values that are associated with the bucket, and wherein the instructions are such that the constructing a histogram includes:
   counting each path-value pair in the document;
   outputting a collection of path-value-count triples sorted by said counting; and
   partitioning the collection of sorted path-value-count triples into said buckets.

* * * * *